(12) United States Patent
Mergl et al.

(10) Patent No.: US 10,766,499 B2
(45) Date of Patent: Sep. 8, 2020

(54) VEHICLE SYSTEM, METHOD FOR CONTROLLING VIBRATION UNITS AND USE OF VIBRATION UNITS OF A VEHICLE SYSTEM

(71) Applicant: Brose Fahrzeugteile GmbH & Co. Kommanditgesellschaft, Coburg, Coburg (DE)

(72) Inventors: Christian Mergl, Zeil (DE); Wojciech Falinski, Coburg (DE)

(73) Assignee: BROSE FAHRZEUGTEILE GMBH & CO. KOMMANDITGESELLSCHAFT, COBURG, Coburg (DE)

(*) Notice: Subject to any disclaimer, the term of this patent is extended or adjusted under 35 U.S.C. 154(b) by 0 days.

(21) Appl. No.: 16/036,974

(22) Filed: Jul. 17, 2018

(65) Prior Publication Data
US 2019/0016347 A1 Jan. 17, 2019

(30) Foreign Application Priority Data
Jul. 17, 2017 (DE) .......................... 10 2017 212 195

(51) Int. Cl.
*B60W 50/16* (2020.01)
*B60Q 9/00* (2006.01)
(Continued)

(52) U.S. Cl.
CPC .............. *B60W 50/16* (2013.01); *B60N 2/90* (2018.02); *B60Q 9/00* (2013.01); *B60W 20/00* (2013.01);
(Continued)

(58) Field of Classification Search
CPC .... B60W 50/16; B60W 20/00; B60W 50/082; B60W 50/085; B60W 2050/0026;
(Continued)

(56) References Cited

U.S. PATENT DOCUMENTS 5,483,446 A * 1/1996 Momose ................. F16H 59/00
701/1
8,041,484 B2 * 10/2011 Imai ....................... B60N 2/002
701/46

(Continued)

FOREIGN PATENT DOCUMENTS

DE 102011000175 A1 7/2012
DE 102013211158 A1 1/2014
(Continued)

OTHER PUBLICATIONS

English machine translation of Werner (WO2004018890) (Year: 2004).*
English machine translation of Kiltz (DE102016211084-A1) (Year: 2017).*
(Continued)

*Primary Examiner* — Mahmoud S Ismail
*Assistant Examiner* — Bakari Underwood
(74) *Attorney, Agent, or Firm* — Manelli Selter PLLC; Edward Stemberger

(57) ABSTRACT

The present invention relates to a vehicle system, in particular a vehicle seat system, having at least one vibration unit which is configured and disposed to generate vibrations perceptible for a passenger of a motor vehicle, based on real current drive parameters of the motor vehicle. The present invention further relates to a method for controlling and the use of at least one vibration unit of a vehicle system.

15 Claims, 2 Drawing Sheets

(51) Int. Cl.
  *B60W 50/08* (2020.01)
  *G05D 1/02* (2020.01)
  *B60N 2/90* (2018.01)
  *B60W 20/00* (2016.01)
  *B60W 50/00* (2006.01)

(52) U.S. Cl.
  CPC ........ *B60W 50/082* (2013.01); *B60W 50/085* (2013.01); *G05D 1/021* (2013.01); *B60N 2002/981* (2018.02); *B60W 2050/0026* (2013.01); *B60W 2510/0666* (2013.01); *B60W 2510/085* (2013.01); *B60W 2510/10* (2013.01); *B60W 2520/26* (2013.01)

(58) Field of Classification Search
  CPC ... B60W 2510/0666; B60W 2510/085; B60W 2510/10; B60W 2520/26; B60N 2/90; B60Q 9/00; G05D 1/021
  See application file for complete search history.

(56) References Cited

U.S. PATENT DOCUMENTS

| | | | |
|---|---|---|---|
| 10,173,696 B2* | 1/2019 | Yamaguchi | G08B 21/06 |
| 2017/0057354 A1* | 3/2017 | Nishihara | B60K 28/16 |
| 2017/0341575 A1* | 11/2017 | Hauler | B60Q 1/30 |
| 2019/0193754 A1* | 6/2019 | Augst | B60W 50/0097 |

FOREIGN PATENT DOCUMENTS

| | | | | |
|---|---|---|---|---|
| DE | 102014015074 A1 | 4/2016 | | |
| DE | 102016115480 A1 | 3/2017 | | |
| DE | 102016211084 A1 * | 12/2017 | ........... | F02D 41/263 |
| WO | WO-2004018890 A2 * | 3/2004 | ........... | F16D 48/06 |

OTHER PUBLICATIONS

English machine translation of Werner (WO2004018890-A2) (Year: 2004).*
Search Report in DE 102017212195.5 dated Apr. 19, 2018.

* cited by examiner

VEHICLE SYSTEM, METHOD FOR CONTROLLING VIBRATION UNITS AND USE OF VIBRATION UNITS OF A VEHICLE SYSTEM

FIELD

The present invention relates to a vehicle system, in particular to a vehicle seat system, to a method for controlling vibration units which are provided in a motor vehicle in a manner perceptible to a passenger during operation, and to the use of vibration units of a vehicle system.

TECHNICAL BACKGROUND

In modern motor vehicles, especially in the premium and luxury segment, increasing decoupling and insulation of the vehicle interior is being carried out due to comfort requirements. In addition, the drive trains are being electrified increasingly, which reduces vibrations compared to pure combustion engines. Both cases lead to a hardly noticeable tactile feedback of drive-related parameters being transmitted to the vehicle passengers, especially a vehicle driver. A tactile driving experience thus becomes increasingly more neutral.

Nevertheless, it is a customer need to intensify a driving experience, at least adapted to the situation.

For example, it is known to generate artificial engine noises in the passenger compartment. DE 197 46 523 A1 discloses the generation of artificial engine noises in the form of additional noises dependent on the natural engine noise of an internal combustion engine in order to provide a more attractive or, adapted to the situation, more sporty engine sound in the vehicle interior. The additional noise is dependent on speed and load, with corresponding sensors provided on the vehicle's internal combustion engine.

In addition, it is known to provide vibration units in a vehicle system to generate tactile stimuli. For example, WO 2017/025204 A1 discloses vibration units in a vehicle seat that are used to intensify an acoustic entertainment signal. Furthermore, it is proposed there, especially in an electric vehicle, to supplement an artificially generated engine noise with a control of vibration units based on it. In this way, for example, the vibrations of an internal combustion engine may be imitated. Disadvantageously, the vibration sometimes depends essentially only on the frequency, i.e. the artificially indicated motor speed of the artificially generated motor noise.

SUMMARY

In view of this background, it is an aspect of the present invention to provide an improved vehicle system which intensifies the tactile driving experience in a motor vehicle.

According to the present invention, a vehicle system and/or a method having the features described herein is provided.

Accordingly, it is provided:
A vehicle system, in particular a vehicle seat system, comprising at least one vibration unit, which is configured and disposed to generate perceptible vibrations for a passenger of a motor vehicle based on real current drive parameters of the motor vehicle;
A method for controlling at least one vibration unit, in particular a vehicle system according to the present invention, the method being provided in a motor vehicle in a manner perceptible to a passenger during operation, comprising the following method steps: calculating a control signal correlating with current real drive parameters of the motor vehicle; and controlling the at least one vibration unit based on the control signal correlating with current drive parameters of the motor vehicle;
A use of at least one vibration unit of a vehicle system, in particular of a vehicle seat system, in a motor vehicle for re-production of vibrations based on real drive parameters of the motor vehicle.

One idea based on the present invention is to intensify a driving experience by means of vibrations that may be sensed by a passenger based on real drive parameters of the vehicle.

For example, a direct tactile feedback or a so-called force-feedback of current drive influences, in particular the currently output power of the drive, may be generated by the vibrations, which leads to a stronger sensation of acceleration. A stronger acceleration is an intensification of the driving experience. According to one of the ideas of the present invention, an increase in tactile feedback from a drive train by means of corresponding vibrations is therefore provided.

Furthermore, according to one of the ideas of the invention, a tactile driving experience of a predetermined drive train may also be generated independently of an actual drive train. For example, driving an electric motor vehicle may feel like driving a motor vehicle with an internal combustion engine to the driver or passengers. Nevertheless, the vibration of the vibration unit used for this purpose is based on real drive parameters of the (real) motor vehicle.

In addition, according to one of the ideas of the present invention the tactile driving experience may also be adapted to the individual or current preferences of a passenger, especially the driver. According to one of the ideas of the present invention, the individualization of a motor vehicle is thus improved.

In addition, customer satisfaction may also be increased through more variety in the everyday driving experience. For example, it is possible to switch daily between the tactile driving experience of different vehicles, even though the same vehicle is actually driven. For this purpose, it is conceivable, for example, that different characteristics of the tactile feedback may be selected by the at least one vibration unit. The selection option may be provided, for example, with a so-called driving experience switch or selector. Driving experience switches are sometimes used for situation-adaptive adjustment of engine sound, throttle response, chassis adjustment or steering adjustment, for example in the Comfort Mode, Eco Mode, Sport Mode and Sport Plus Mode. The functionality of the different modes of a driving experience switch may now be supplemented by adapting the tactile feedback of drive parameters according to one of the ideas of the present invention, thus intensifying the respective desired driving experience.

The drive parameters of the motor vehicle may be recorded in particular by means of a recording device. The detection device may be configured, for example, as a connection to a vehicle network, such as a CAN bus or FlexRay BUS, for retrieving driving dynamic parameters. Alternatively or additionally, it may also be a sensor system for directly detecting driving dynamic parameters, for example an acceleration sensor.

The vibration units may then be controlled in various ways based on real current drive parameters of the vehicle. For example, a control signal may be calculated based on the real drive parameters, which is only used for control of the vibration units. It is therefore a direct control.

According to a further embodiment, for example, a noise signal based on real drive parameters may also be used to control the vibration units. The noise signal may be a real noise signal, for example detected by means of a suitable sensor or microphone arranged on the drive train. It may also be a noise signal generated based on the real drive parameters, which may be for example output additionally via loudspeakers if required.

In a preferred embodiment, the at least one vibration unit is integrated into a vehicle seat, i.e. seat-integrated. Advantageously, vibrations in direct body contact or indirect body contact may be sensed by the passenger. A characteristic feature of the seat-integrated vibration unit is that it only generates local vibration in the seat, i.e. the seat as a whole is not moved. In particular, this is not a ("back and forth") shaking of the entire seat, but merely a vibration generated locally in the seat, especially in the seat foam, which may be felt by a passenger.

The vibration unit preferably has an electric rotational motor, for example a brushed motor or a brushless motor. In the case of a rotational motor, the motor preferably has a rotating flywheel mass. Alternatively or additionally, a special vibration motor, such as a so-called LRA (Linear Resonant Actuator), CVM (Coin Vibration Motor) or ERM (Eccentric Rotating Mass) actuator or the like, may be provided.

Preferably, a plurality of vibration units is provided in the vehicle system, in particular in the vehicle seat system. For example, a number of vibration units may be integrated into a vehicle seat.

The inventive use of the vibration units serves to intensify a driving experience in a motor vehicle. Preferably, vibration units integrated in a vehicle seat are used for this purpose.

Advantageous embodiments and further configurations result from the further sub-claims as well as from the specification with reference to the figures in the drawing.

According to one aspect, the vehicle system comprises a calculating device which is configured to calculate a control signal correlating with real current drive parameters of the motor vehicle. In addition, a control device is provided which is configured to control the at least one vibration unit based on the control signal correlating with current real drive parameters of the motor vehicle. The calculation of a control signal as an intermediate step of the control allows a higher flexibility in the selection and/or weighting of the drive parameters used for the calculation compared to a direct control, such that, for example, a situation- or selection-adapted calculation is possible.

The calculating device may be configured in particular as a control device or as a software module or software function of a control device, in particular a body control unit. For example, to calculate the control signal, a speed of an internal combustion engine (actually present or to be imitated) may specify a basic frequency for calculating the control signal, and the load condition of the real drive engine of the motor vehicle, as a real drive parameter, may specify a strength or amplitude for calculating the control signal. These input values are then converted into a control signal using for example a calculation algorithm suitable for generating the control signal. Optionally or in addition to a current load condition, it is also conceivable, for example, to provide a current accelerator pedal position as a real drive parameter with regard to the strength of the control signal to be calculated. Further drive parameters may also be used optionally or additionally.

In one aspect, the real drive parameters are directly converted into a control signal suitable for controlling the vibration units, which in this case may also be at the same time the control signal. In this case it is therefore conceivable to integrate the calculating device and the control device with each other.

In addition, however, indirect control is also conceivable, wherein a control signal to be transmitted to the control device is initially calculated by the calculating device, and wherein the control device converts this control signal into a control signal or power signal in order to control the vibration units for vibration, in particular with a suitable power signal.

Such indirect controls may be configured in different ways. In particular, the control signal does not have to be a pure control signal. Rather, it is also conceivable to generate a drive noise signal configured to the real drive parameters based on the real current drive parameters by means of a calculation device configured as a noise generator. This generated drive noise signal is then used as a control signal for the control device. Accordingly, the vibration unit is controlled by the control device based on the generated drive noise signal.

According to a preferred embodiment, the at least one vibration unit is configured as a rotational motor. This motor preferably has a flywheel mass on the motor shaft. In particular, such a rotational motor is integrated or seat-integrated in a vehicle seat. For example, it may be arranged within a seat foam of the vehicle seat.

The rotational motor may be an unbalance motor with an eccentric unbalance mass as an inertia mass. Acceleration and braking of the motor or the unbalance mass of the motor produce a resulting force that may be felt by the passenger of the seat. During faster or longer movements, the unbalance of the unbalance mass thus causes a vibration.

According to a further embodiment, the rotational motor may also be a motor with an unbalanced flywheel mass on the motor shaft. For example, a rotationally symmetrical body is attached to the motor shaft. In this case, the acceleration and braking of the motor or the unbalanced flywheel mass produces a restoring force or a restoring torque. Vibrations may thus be generated by pulsed or alternating control of the motor and continuous acceleration and deceleration of the motor. In this case, a control signal for controlling the vibration unit by means of the control device is provided in the form of pulses or alternating.

According to a preferred embodiment, the calculating device is configured to include a currently requested drive power of the motor vehicle as a drive parameter for calculating the strength of the control signal. In particular, a directly proportional relationship between a level of the currently requested drive power and a strength of a calculated drive power control signal may be provided. Depending on the strength of the drive power control signal, the control device then operates the vibration unit at a more or less strong vibration. For example, when calculating the control signal, at full load of the drive engine of the motor vehicle, i.e. at maximum acceleration, a maximum strength of the control signal may be provided, and at partial load, a correspondingly proportional strength of the control signal may be provided. This allows the control device to control the vibration unit at full load in accordance with the maximum strong control signal to a maximum strength of the vibrations, and at partial load to a correspondingly reduced strength of the vibration. For example, a type of calculation may be specified by $$Sb = M/M\_max * Smax$$

where Sb represents the calculated control signal. The factor, M/M_max, is composed of the current engine load or the current torque M of the drive motor of the motor vehicle and a maximum engine load or torque M_max of the drive motor of the motor vehicle at a current speed. Smax is the control signal required to control the vibration units with maximum strength.

As an alternative to the motor load or the torque of the drive motor, the current power of the motor in relation to a maximum power at the current speed may also be used.

A further possible calculation formula may also use as a factor the current power of the motor in relation to the maximum power over the entire speed range.

As an alternative to a current load state, a current accelerator pedal position may also be used as a real drive parameter for calculating the control signal. Accordingly, the strength of the control signal may be directly proportional to a current accelerator pedal position. This means, for example, that 50% of the maximum force is applied with 50% or half of the accelerator pedal depressed, and the maximum force is applied with the accelerator pedal fully depressed. A suitable type of calculation may be specified, for example, by $$Sb = G/Gmax * Smax$$

where Sb represents the calculated control signal, G the current accelerator pedal position, Gmax the maximum accelerator pedal position, and Smax the control signal required to control the vibration units with maximum force. The G/Gmax factor may also be substituted by a relative accelerator pedal position indicated as a percentage value [%].

According to a further embodiment, the calculating device is configured to provide calculation of a strength of the control signal independent of a current speed of a motor vehicle drive motor. A frequency of the control signal may be based on the real or a (different) imitated speed. However, the strength of the control signal depends only or at least essentially on real drive parameters, such as for example the real power output of the drive motor. The strength of the vibration is therefore speed-independent. This is particularly advantageous if the power or torque output in a real drive concept is not directly related to the speed, as in an electric vehicle without an internal combustion engine or in a plug-in hybrid vehicle at pure electric operation.

According to another aspect, the calculating device is configured to include a current slip of at least one drive wheel as a drive parameter for calculating the control signal. In this way, the driver receives an improved haptic feedback on friction conditions between the drive wheels and a driving surface, and may thus adapt his driving style better or faster to current friction values. The slip is converted, for example, as a control signal for controlling a low-frequency vibration. This low-frequency vibration can, for example, intensify the haptic feedback when tires slip during a wheelspin.

Alternatively or additionally, the calculating device may also be configured to include a slip of at least one drive wheel caused by current drive command inputs, for example a current accelerator pedal position, and prevented by a driver assistance system, as a drive parameter for calculating the control signal. Accordingly, a theoretical slip or slip controlled by an assistance system may also be used as a basis for tactile feedback or slip-force-feedback. If the slip is not intended by a driver, the driver of the vehicle will therefore adjust his driving style to avoid intervention by the assistance system. However, if, for example, the driving experience of a certain slip is desired for a more intensive driving experience, this intensive driving experience may be conveyed in accordance with one of the ideas of the invention, without the wear occurring on the vehicle which occurs during a real slip.

For the calculation of a slip control signal, for example, the calculating device may be configured to provide a directly proportional relationship between the amount of actual slip or slip prevented by assistance systems and a strength and/or frequency of a slip control signal. Thus, the strength and/or frequency of the slip control signal and thus also the correspondingly controlled vibrations may increase with higher slip, i.e. for example with wheels spinning more strongly. A frequency range of the slip control signal remains nevertheless preferably comparatively low, especially below the frequencies intended for vibrations of a drive train. For example, the frequency range of the slip control signal may be in the low audible frequency range, especially <50 Hz.

According to a further embodiment, the calculation device is configured to include current or currently planned or imitated shifting operations in a drive train of the motor vehicle as current real drive parameters for the calculation of the control signal. In this way, a driving experience may be further intensified.

In modern vehicle transmissions, especially dual-clutch transmissions, gearshifts are nowadays possible without noticeable interruption of traction. Although this is advantageous from a driving dynamics point of view, a subjectively perceived tactile feeling of shifting that is often pleasant for the driver is lost. This feeling may, according to one of the ideas of the present invention, be created without the driving dynamic disadvantages of traction interruption. The same also applies to simulated shifting operations, e.g. with single-stage electric drives or CVT (Continuously Variable Transmission) transmissions.

For example, during a shifting operation, a vibration unit generating the vibrations of an internal combustion engine may be briefly interrupted. A brief change in the frequency of the vibration and/or a sudden brief change in the intensity of the vibrations are also conceivable.

In particular, the calculating device is configured to provide a directly proportional relationship between the level of the currently requested drive power and the strength of a calculated switching control signal in order to calculate the control signal. With a higher load on the vehicle drive motor, the control of the vibration unit for the reproduction of a vibration reproducing a shifting jolt or a shifting interruption is thus also stronger.

In particular, according to one of the ideas of the invention, the driving experience of shifting operations may also be generated independently of a real drive train of the motor vehicle. In this way, for example, in a vehicle with continuously variable CVT transmission or single-stage electric drive, a tactile driving experience such as a sequential sports transmission or a dual-clutch transmission may be provided for a passenger, in particular the driver.

One aspect also provides for the alternative or additional intensification of crackles on overrun, also known as "backfire", i.e. the generation of one or more crackles by provoked afterburning in the exhaust system, with corresponding vibrations. This means that when overrun crackles are applied accordingly, for example in drag mode at higher speeds of an internal combustion engine (e.g. by deactivating the overrun cutoff) or during a shift operation at full throttle (e.g. in the event of an ignition interruption during a shift operation of a DSG transmission), a suitable control of the vibration unit may be provided when calculating the control signal, such that a passenger additionally senses the crackles on overrun in the form of vibration. This may be either situation-configured or selective, for example in a "Sport plus" mode set via the driving experience switch.

According to another aspect, the calculating device is configured to superimpose several drive parameters and/or several individually calculated control signals in order to calculate the control signal. For example, a drive power control signal may be superimposed with a possible slip control signal and/or a possible shifting operation control signal. A control of the at least one vibration unit by the control device is accordingly based on the superimposed control signal. Alternatively or additionally, several control signals may be provided in parallel as input signals for controlling the at least one vibration unit.

According to a further embodiment, a storage device is also provided, wherein the calculating device is configured to retrieve at least one characteristic of the control signal from a predetermined characteristic curve stored in the storage device or from a predetermined characteristic map stored in the storage device in order to calculate the control signal depending on current real drive parameters of the motor vehicle. The parameter may be a speed-dependent frequency-response characteristic of an internal combustion engine. The characteristic map thus specifies the current vibration frequency, while the strength of the vibration is indicated by the current drive parameters, in particular the current drive power.

According to an advantageous further embodiment, the calculating device is configured to retrieve at least one characteristic from a plurality of different characteristic curves or characteristic maps stored in the storage device in order to calculate the control signal, wherein the characteristic curve used or the characteristic map used is selectable by a user.

The selection is preferably an indirect selection of a characteristic map, whereby the user selects a desired characteristic of the vibrations on a suitable control device, such as a driver's experience switch or a correspondingly configured user interface of the on-board computer or a smartphone app, and wherein a suitable characteristic map or a suitable characteristic curve is stored for this characteristic.

According to a further embodiment, a characteristic curve or a characteristic map is each characterized by the drive noises of a specific motor vehicle drive train. Accordingly, different characteristic curves or maps are characterized in particular by drive noises of different drive types and/or different designs of a vehicle drive motor.

For example, drive noises of different drive types may be noises from a vehicle drive train with an internal combustion engine, electric motor or hybrid drive.

In the case of internal combustion engines, for example, the different types of a vehicle drive engine may comprise internal combustion engines with 3-, 4-, 5-, 6-, 8-, 10-, 12- or 16-cylinders. Vibration may be provided, for example, at the frequency of the engine type-related ignition sequence. For a 4-cylinder/4-stroke engine, for example, a frequency range of vibrations, especially speed-dependent, may be provided between approx. 30 Hz to 200 Hz, for an 8-cylinder/4-stroke engine a frequency range of vibrations from 60 Hz to 400 Hz may be provided, etc. With an electric drive, for example, a high-frequency vibration may be provided, especially also speed- and/or velocity-dependent, in the range from 200 to 2000 Hz. Other frequency ranges are of course possible. Also overlapping frequency ranges are conceivable. In a hybrid drive, for example, the two frequencies of an internal combustion engine and an electric motor may be superimposed, particularly in a situation-adaptive manner. For example, the vibration unit may only be controlled with the frequency of the electric motor when starting from a standstill with small load, with the frequency of both engines when starting at full load and only with the frequency of the combustion engine when driving at high speed with partial load, for which a corresponding control signal is calculated or generated.

Furthermore, it is conceivable, in the case of a purely electric drive, to refrain from a control signal indicated by the drive train, and to provide, for example, only a slip control signal as a real drive parameter. Alternatively or additionally, a control signal may also imitate the haptic feedback of an internal combustion engine.

Overall, different characteristics or modes may be selected for a user, and the user may select a corresponding driving experience with different drive types or designs. In a motor vehicle, the tactile driving experiences of different drive trains may thus be available as a choice, especially independently of an actual drive train of the motor vehicle.

According to a further embodiment, a plurality of individually or in groups controllable vibration units is provided. The calculation device is configured to calculate the control signal individually for controlling the individual vibration units. Alternatively or additionally, the calculating device is configured to calculate the control signal for the site-specific control of vibration units or for the control of predetermined groups of vibration units. The calculation of the control signal may be provided in particular according to a characteristic configured to a selected characteristic map or a selected characteristic curve or according to a characteristic specified by the selected characteristic map or the selected characteristic curve. In particular, the calculation device may thus calculate the control signal for differently placed vibration units in different ways, depending on the selection of the desired characteristic. For example, the vibration units are distributed in a vehicle seat such that vibration units that may be controlled individually or in groups or site-specifically are provided especially for vibrations in the buttocks, thighs, lower back and upper back area. Thus, for example, a vibration in the thigh area may be specifically stronger than in the back area, and vice versa.

According to a further embodiment, the various characteristic maps are characterized by a tactile feedback of the different dynamic behavior of different vehicle drive trains. In particular, the different behavior when changing the load of different types of drive motors may be mapped in the characteristics of the vibrations. Alternatively or additionally, the different pitching behavior with different configurations of driven wheels of the motor vehicle may be mapped in the characteristics of the vibrations.

A characteristic of dynamic driving behavior for different drive trains may manifest itself in particular in a different distribution of the strength of the vibrations in the seat. For example, the intensity and/or the distribution of vibrations when changing between overrun mode and drag mode of an internal combustion engine may differ from those when changing between engine and generator operation of an electric drive. In particular, the respective drive dynamic torque, especially the pitching torque, of the motor vehicle is intensified in different ways with a vibration in the lower thigh area. In an internal combustion engine, for example, the intensity of vibration may depend on the speed of the combustion engine. For example, a drag torque at high speed is higher, such that a vibration in the thigh area is stronger than at low speed. On the other hand, with an electric drive, the drag torque may always be approximately the same when changing from engine operation to generator operation, even at different speeds, such that a vibration in the thigh area provided for in drag operation is always similarly strong.

Conversely, the driving dynamics behavior when changing from generator to engine operation of the electric drive may also differ from the combustion engine, for example by the fact that a high torque is applied immediately upon load changes. This may be transmitted, for example, by stronger vibration in the upper back area and thus intensify the driving experience with electric drive. The vibrations during load changes of an electric drive may also be of generally higher frequency than during load changes of an internal combustion drive.

Alternatively or additionally, different configurations of driven wheels may also characterize the intensity distribution during acceleration. For example, a front-wheel drive vehicle has a lower pitching torque than a rear-wheel drive vehicle. Therefore, with front-wheel drive the intensity of the vibration will be higher in the thigh area, with rear-wheel drive the intensity of the vibration will be more at the upper back. With four-wheel drive, a mixture or superimposition of the two types of drive, for example in the form of a greater intensity of vibrations, may be more likely in the lower back area.

Preferably, an operational device is provided for selecting the desired characteristics, which provides a selection option for selecting different driving experience modes. In particular, a predetermined characteristic map and/or a predetermined characteristic are stored for each mode. The operational device may be an operational device or panel of a vehicle on-board computer, an interface coupling to a smartphone with a corresponding app, a driver's experience switch or similar.

According to a further embodiment, the calculation device is configured to calculate the control signal in such a way that the control device may be deactivated in an autonomous driving mode of the motor vehicle. In particular, the control device may be automatically deactivated when switching to the autonomous driving mode. The advantage of an autonomous motor vehicle in autonomous driving mode is that there is no distraction from other activities such as work, reading, conversations, or the like. In particular, the automatic deactivation may be provided in such a way that manual reactivation is possible. Furthermore, it is conceivable to provide a default setting that may be adjusted such that it may be selected whether or not the vibration function should be automatically deactivated when switching to the autonomous driving mode.

The above embodiments and further configurations may be combined with each other as long as they make sense. In particular, all features and aspects of an inventive vehicle system with at least one vibration unit may be transferred to an inventive method for controlling at least one vibration unit. In particular, all features and aspects of an inventive vehicle system with at least one vibration unit may be transferred to an inventive use of at least one vibration unit of a vehicle system.

Further possible embodiments, further configurations, and implementations of the invention also comprise combinations of features of the invention not explicitly mentioned above or described below with regard to the exemplary embodiments. In particular, the skilled person will also add single aspects as improvements or supplements to the respective basic embodiment of the present invention.

BRIEF DESCRIPTION OF THE DRAWINGS

The present invention will be explained in more detail below using the exemplary embodiments given in the schematic figures of the drawings, wherein.

Figure 1:
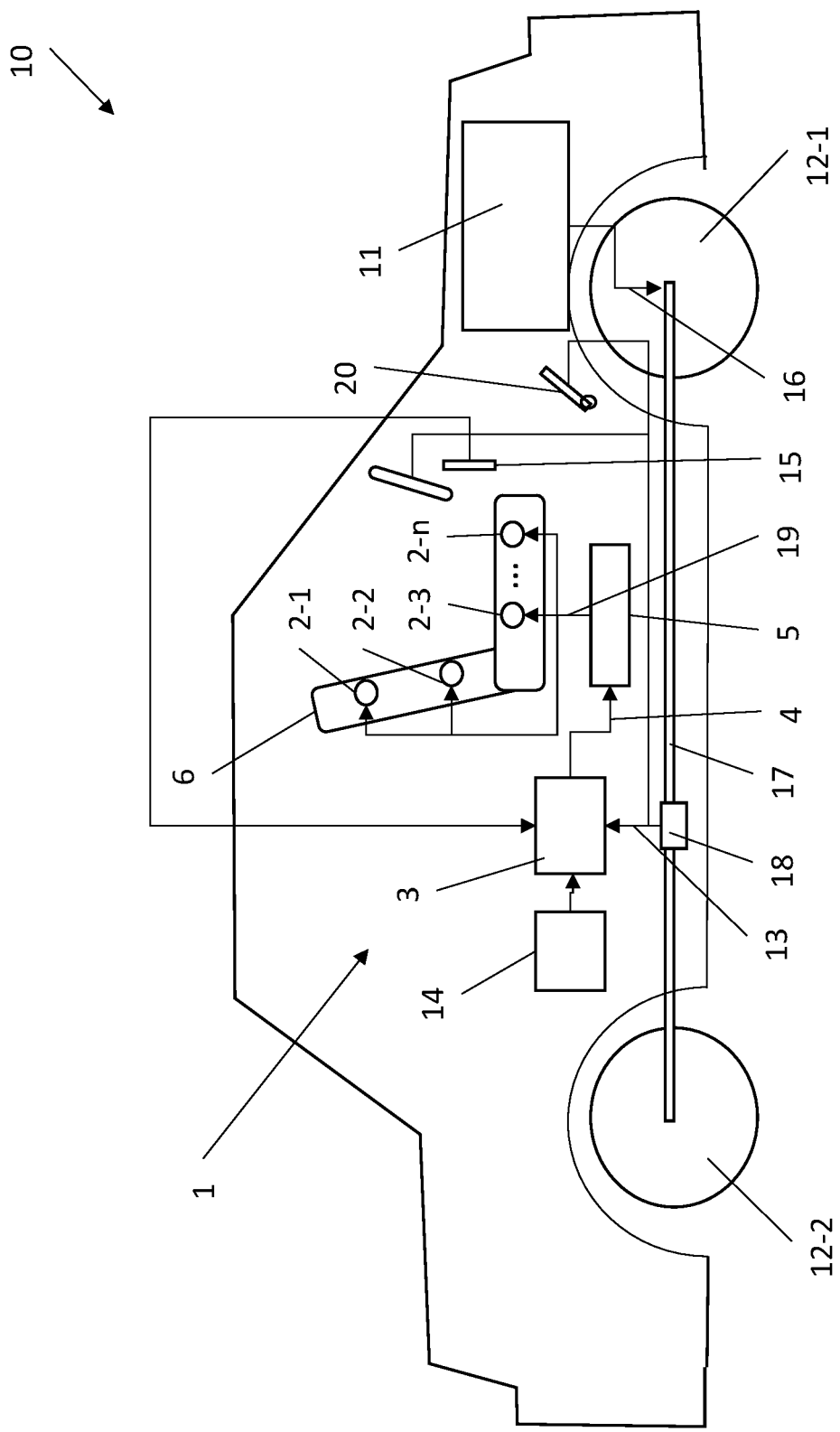
FIG. 1 is a schematic view showing a vehicle system.

The figures enclosed in the drawing are intended to provide a better understanding of the embodiments of the invention. They illustrate embodiments and serve, in connection with the present description, to explain the principles and concepts of the invention. Other embodiments and many of the advantages mentioned result from the drawings. The elements depicted in the drawings are not necessarily shown to scale.

In the figures of the drawing, identical, functionally identical and equally functioning elements, features and components—unless otherwise specified—are each indicated with the same reference numerals.

DESCRIPTION OF EXAMPLE EMBODIMENTS

FIG. 1 shows a schematic view of a vehicle system 1.

The vehicle system 1 is integrated into a motor vehicle 10 and has a plurality of vibration units 2-1 to 2-n integrated into a vehicle seat 6. The vibration units 2-1 to 2-n are configured and arranged in order to generate vibrations perceptible for a passenger of the vehicle 10 based on real current drive parameters 13 of the vehicle 10.

The motor vehicle has a drive train which is—for a better understanding—not shown here in detail. Depending on the type of drive train, different assemblies and components belong to a drive train. For example, a drive train in vehicles only with internal combustion engine comprises the engine itself, which is coupled to a flywheel, a clutch, a vehicle transmission, usually a differential, drive shafts or thru axles, and drive wheels. In the case of rear or all-wheel drive motor vehicles, additional drive shafts or cardan shafts, possibly a viscous coupling, a reduction gear, a universal joint or a rag joint, a center bearing and, if necessary, a center differential, are also comprised.

In a hybrid drive train, in addition to the conventional internal combustion engine, an electric motor is also provided in the drive train, which in certain situations adopts part or the entire role of the vehicle drive.

In comparison, an electric drive train is considerably reduced, as essential parts such as the flywheel, the clutch and the manual gearbox may be omitted. Often, however, one motor is used per driven axle, such that drive shafts and a differential are still required. Alternatively, so-called wheel hub motors may also be provided, such that the drive train requires practically no additional components.

In the vehicle system 1 according to the present invention, the vibration units 2-1 to 2-n are provided to intensify the driving experience by increasing or imitating tactile feedback from the drive train.

The vibration units 2-1 to 2-n are integrated in the vehicle seats and are configured to generate vibrations, which may be sensed by the passenger, directly or indirectly based on real current drive parameters 13 of the motor vehicle 10.

In order to generate the vibrations, the real drive parameters 13 of the motor vehicle 10 are first retrieved by a vehicular network 17, for example a CAN bus. For this purpose, a detection device 18 in the form of a corresponding network connection is provided. Alternatively or additionally, a detection device 18 may also be configured as a sensor, for example an acceleration sensor, for the detection of real drive parameters.

The real drive parameters 13 serve as an input parameter for a calculating device 3, which is configured to calculate a control signal 4 correlating with the real actual drive parameters 13 of the motor vehicle 10. The calculating device 3 may be provided in particular as a control device or as a software module or software function of a control device, in particular a body control unit. For example, to calculate the control signal 4, a current status information 16 of the drive motor 11 of the motor vehicle 10 is retrieved. In this way, for example, a speed to be imitated or a real speed of an internal combustion engine may indicate a frequency of the control signal 4, and a load condition of the drive engine 11 of the motor vehicle 10 retrieved from the status information 16 may indicate a strength or amplitude of the control signal 4. Alternatively or additionally, a current position of an accelerator pedal 20 may also be used to calculate the control signal 4. Preferably, a directly proportional relationship is always provided between a current load condition, in particular a drive power currently being retrieved, and the strength of the control signal 4, which is associated with a strength of the vibrations to be generated. For example, a calculation formula may be specified by $$Sb = P/P\_max * Smax$$

wherein Sb is the calculated control signal. The factor P/P_max is composed of the relation between the current engine power P of the drive motor 11 of the motor vehicle 10 and the maximum engine power. Smax represents the control signal required to control the vibration units with maximum strength. Of course, other factors based on real drive parameters are also possible, for example based on the current engine torque in relation to the maximum engine torque or the current accelerator pedal position in relation to the maximum accelerator pedal position.

The calculated control signal 4 is transmitted to a control device 5, which, based thereon, provides to the vibration units 2-1 to 2-n a control signal 19, in particular a power signal suitable for controlling the vibration units 2-1 to 2-n.

In one embodiment, the control signal 4 is provided as a noise signal, which depends on the real drive parameters. For example, it may be an artificially generated or amplified drive train noise signal, such as an engine sound of an internal combustion engine. In this case, the control unit 5 is configured to convert a noise signal into a control signal for controlling the vibration units. In this case, the calculating device may be configured as a noise generator which generates a noise signal based on real drive parameters.

The calculating device 3 is preferably also configured to take into account several real drive parameters being superimposed on each other when calculating the control signal 4. In this way, a possible actual slip of at least one drive wheel 12-1 and/or 12-2 is preferably included in the calculation of the control signal 4. If slip occurs, the control signal 4 is superimposed with a slip control signal, i.e. additionally provided with a frequency in the low audible range, for example between 3 and 50 Hz. A strength and/or frequency of the slip control signal may increase with higher slip, i.e. more spinning wheels.

In the same way as a slip currently occurring, a slip currently caused by drive command inputs and controlled or prevented by a driver assistance system may serve as a real drive parameter as an input parameter for calculating the slip control signal. The tactile slip feedback and slip force feedback thus achieved enables an intensive driving experience with little wear on the vehicle and avoiding critical driving conditions.

In one embodiment, the calculating device 3 is also configured to include shifting operations in a drive train of motor vehicle 10 as drive parameter 13 for calculating the control signal 4. For example, a tactile feedback of a shift jerk and/or a crackle on overrun may be generated. For example, a directly proportional relationship between the amount of drive power currently requested and the strength of a calculated shift operation control signal may be provided.

In this way, the driving experience of shifting operations may also be generated independently of a real drive train of the motor vehicle 10, if desired.

The vehicle system 1 also comprises a storage device 14 in which predetermined characteristic curves or characteristic maps of different characteristics are stored for the calculation of different control signals, whereby an operator may select a desired characteristic. The parameter comprises in particular a speed-dependent frequency response of an internal combustion engine. The characteristic map thus specifies the current vibration frequency, wherein the strength of the vibration is provided in correlation with the current drive parameters 13, for example the current drive power.

An operational device 15 is provided for selecting a desired characteristic, in this example in the form of a vehicle-integrated touchscreen user interface. Alternatively, a smartphone app or a driving experience switch may also be provided in order to select a characteristic.

Different characteristics with their associated characteristic curves or maps are characterized by drive noises of different drive types or different designs of a vehicle drive motor.

In the case of internal combustion engines, for example, the sound type may comprise different designs, for example internal combustion engines with 5-, 6-, 8- or 10-cylinders, naturally aspirated and turbocharged, respectively. For a 4-cylinder/4-stroke engine, for example, a frequency range may be provided of vibrations over the speed range adapted to the ignition sequence between approx. 30 Hz to 200 Hz, for an 8-cylinder/4-stroke engine a frequency range may be provided from 60 Hz to 400 Hz etc. In a turbo engine, the vibration may be supplemented by the high frequency representing the turbine whistling.

Other types of drive trains may also be stored, for example an electric drive with only high audible frequencies and an increased slip control signal due to the typically high torque.

Of course, a hybrid drive train may also be stored, in which the drive noises of different drive trains may be combined, in particular in a situation-adaptive manner.

In addition, the different characteristics or characteristic maps may provide different tactile feedback for different driving dynamics of different vehicle drive trains. These include the different pitch torques of different configurations of driven wheels 12-1, 12-2, or the different behavior when changing loads of different types of drive motors. The vibration units 2-1 to 2-n are configured individually and may be controlled in order to reproduce this in the form of vibrations perceptible to a passenger. Furthermore, the calculating device 3 is also configured to calculate the control signal 4 individually for controlling the individual vibration units 2-1 to 2-n. As an alternative or in addition to an individual controllability, the vibration units may also be controlled specifically locally or in groups.

For example, the driving experience may be intensified by intensifying a perceived pitching torque when changing to the drag mode of an internal combustion engine or to the recuperation mode of an electric motor by a vibration that is specifically stronger in the thigh area than in the back. Conversely, when changing from generator to engine mode or from drag to overrun mode, the driving experience may be intensified by a stronger vibration in the upper back area.

Furthermore, the driving experience of different configurations of driven wheels, such as front-wheel drive, rear-wheel drive or all-wheel drive, may also be mapped by the intensity distribution during acceleration. For example, a front-wheel drive vehicle has a lower pitching torque when accelerating than a rear-wheel drive vehicle. This is why a front-wheel drive with a lower pitching torque provides a higher intensity of vibration when accelerating in the thigh area than a rear-wheel drive. In the case of rear-wheel drive, on the other hand, vibration at the upper back is provided more strongly to intensify the stronger pitching torque. With four-wheel drive, a mixture or superimposition of the two types of drive, for example to increase the intensity of vibrations in the lower back area, may be provided.

If the vehicle 10 is an autonomously or partially autonomously operable vehicle 10, the intensification of the driving experience may be deactivated by vibrations in an autonomous driving mode of the vehicle. For example, the vibration is automatically deactivated when switching to the autonomous driving mode. Of course, the vibration may be re-activated via the operational device 15 if it is desired despite the autonomous driving mode.

Figure 2:
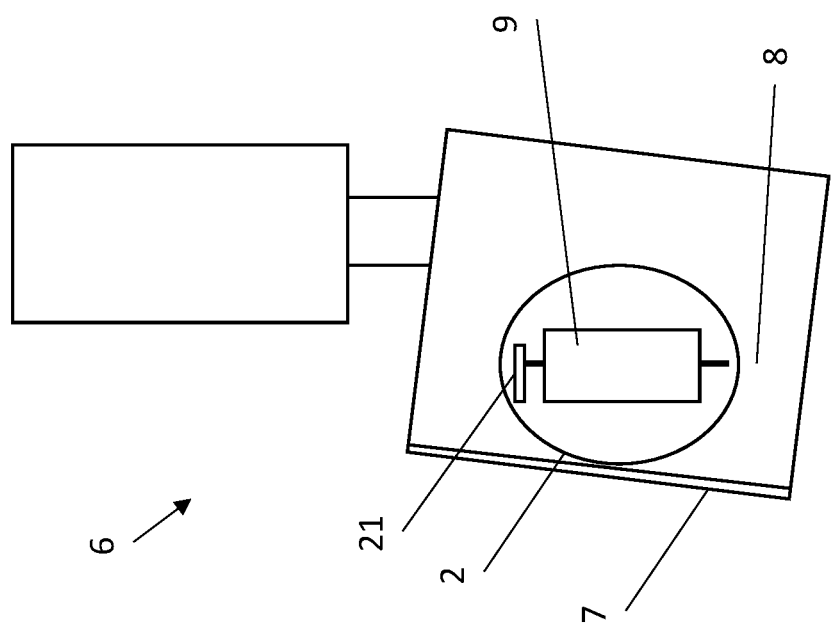
FIG. 2 is a schematic view showing a section of a vehicle seat.

FIG. 2 shows a schematic representation of a section of a vehicle seat 6.

In particular, this may be the upper area of the vehicle seat 6 according to FIG. 1.

A vibration unit 2 is integrated into the vehicle seat 6. For this, the vibration unit 2 is arranged within a seat foam 8 of the vehicle seat 6. The schematic drawing shows a longitudinal cross section through the area of a vibration unit 2.

The vibration unit 2 comprises a rotational motor 9, which is configured as an unbalance motor embedded in the seat foam 8. Accordingly, an eccentric unbalance mass 21 is disposed on the motor shaft of the rotational motor 9.

A characteristic feature of the seat-integrated vibration unit is that it only generates a local vibration in the seat foam 8, which may be felt by a passenger through the cover 7. The seat as a whole is not moved.

Figure 3:
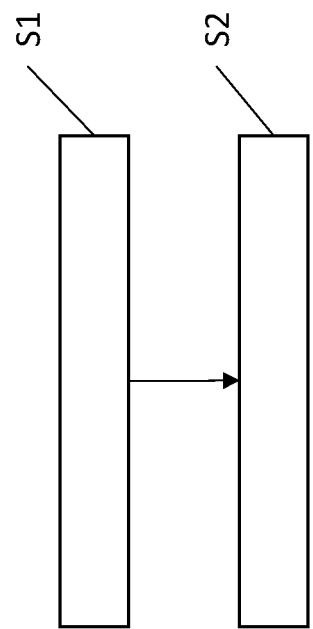
FIG. 3 is a schematic view showing a block diagram of a method for controlling at least one vibration unit.

FIG. 3 shows a schematic view of a block diagram of a method for controlling at least one vibration unit.

In particular, the method may be used to control a vibration unit of a vehicle system shown in FIG. 1.

According to the method, the vibration unit or its vibration may be sensed by a passenger when in operation.

The method includes the step of calculating S1 of a control signal 4 correlating with current real drive parameters 13 of the motor vehicle 10. The calculation S1 is carried out as described in reference to FIG. 1 by means of a calculating device 3.

Furthermore, a step of controlling S2 of the vibration unit based on the control signal 4 correlating with current drive parameters 13 of the motor vehicle 10 is provided. In particular, this involves converting the control signal into a control or power signal for operating the vibration unit 2 in the manner specified by the control signal 4. The step of controlling S2 is carried out as described in FIG. 1 by means of the control device.

Thus, a vibration unit of a vehicle system 1, here a vehicle seat system, is used in a motor vehicle 10 for the reproduction of vibrations based on real drive parameters 13 of the motor vehicle 10. Tactile feedback of the drive parameters is thus intensified, which serves to intensify a driving experience in the motor vehicle 10. Preferably, vibration units 2-1 to 2-n are used which are integrated into the vehicle seat 6, as described with reference to FIG. 1.

Although the present invention has been completely described above by means of preferred embodiments, the present invention is not limited thereto, and may be modified in a variety of ways.

It is conceivable that, for example, vibration units could be placed on or applied to a vehicle seat, for example in the form of a seat mat, instead of seat-integrated vibration units.

In addition, it is conceivable to provide, at other areas of a vehicle system 1 in contact with the body of a passenger, such as a floor panel in contact with the feet of the passenger, an armrest in contact with an arm of a passenger or a center console in contact with a knee of a passenger, one or more vibration units configured and arranged in order to generate vibrations perceptible for a passenger of the vehicle based on real current drive parameters of the vehicle 10.

The invention claimed is:

1. A vehicle system, comprising at least one vibration unit, which is configured and disposed to generate perceptible vibrations as a tactile feedback of current driving influences for a passenger of a motor vehicle correlating with real current drive parameters of the motor vehicle,
   wherein a calculating device, which is configured to calculate a control signal correlating with real current drive parameters of the motor vehicle, and a control unit are provided, which is configured to control the at least one vibration unit based on the control signal correlating with a tactile feedback of different dynamic driving behavior of different vehicle drive trains, and at least by the different behavior during load changes of different drive motor types and/or by the different pitching behavior for different configurations of driven wheels of the motor vehicle.

2. The vehicle system of claim 1,
   wherein the at least one vibration unit is configured as a rotational motor.

3. The vehicle system of claim 2,
   wherein the rotational motor is integrated into a vehicle seat.

4. The vehicle system of claim 1,
   wherein the calculating device is configured to include a currently retrieved drive power of the motor vehicle as drive parameter for calculating the strength of the control signal, in particular with a directly proportional relationship between a level of the currently retrieved drive power and a strength of a calculated drive power control signal.

5. The vehicle system of claim 1,
   wherein the calculating device is configured to provide the calculation of a strength of the control signal independently of a current speed of a motor vehicle drive motor.

6. The vehicle system of claim 1,
   wherein the calculating device is configured to include a current slip of at least one drive wheel or a slip of at least one drive wheel, which is currently caused by drive command inputs and prevented by a driver assistance system, as drive parameters for calculating the control signal.

7. The vehicle system of claim 1,
wherein the calculating device is configured to superimpose a plurality of drive parameters for calculating the control signal.

8. The vehicle system of claim 1,
wherein the calculating device is configured to superimpose a plurality of individually calculated control signals for calculating the control signal.

9. The vehicle system of claim 1,
wherein a storage device is provided, the calculating device being configured to retrieve at least one characteristic parameter of the control signal from a predetermined characteristic curve stored in the storage device or from a predetermined characteristic map stored in the storage device in order to calculate the control signal depending on current real drive parameters of the motor vehicle.

10. The vehicle system of claim 9,
wherein a characteristic curve and a characteristic map are characterized by drive noises of a specific motor vehicle drive train, respectively.

11. The vehicle system of claim 1,
wherein a plurality of individually or in groups controllable vibration units is provided, and in that the calculating device is configured to calculate the control signal individually for controlling the individual vibration units and/or for site-specific control of vibration units and/or for controlling predetermined groups of vibration units, in particular in a characteristic adapted to the selected characteristic map or predetermined by the selected characteristic map.

12. A vehicle system, comprising at least one vibration unit, which is configured and disposed to generate perceptible vibrations for a passenger of a motor vehicle based on real current drive parameters of the motor vehicle,
wherein a calculating device, which is configured to calculate a control signal correlating with real current drive parameters of the motor vehicle, and a control unit are provided, which is configured to control the at least one vibration unit based on the control signal correlating with current real drive parameters of the motor vehicle,
wherein a plurality of individually or groups of controllable vibration units are provided, and the calculating device is configured to calculate the control signal individually for controlling the individual vibration units and/or for site-specific control of vibration units and/or for controlling predetermined groups of vibration units, in particular in a characteristic adapted to the selected characteristic map or predetermined by the selected characteristic map,
wherein the different characteristic maps are characterized by a tactile feedback of the different dynamic driving behavior of different vehicle drive trains, in particular by the different behavior during load changes of different drive motor types and/or by the different pitching behavior for different configurations of driven wheels of the motor vehicle.

13. The vehicle system of claim 12,
wherein the calculating device is configured to provide the calculation of the control signal such that the control device may be deactivated in an autonomous driving mode of the motor vehicle, and in particular may be automatically deactivated when switching to the autonomous driving mode.

14. A method of controlling at least one vibration unit, the method being provided in a motor vehicle in a manner perceptible to a passenger during operation, comprising the following method steps:
calculating a control signal correlating with current real drive parameters of the motor vehicle; and
controlling the at least one vibration unit based on the control signal correlating with current drive parameters of the motor vehicle to generate perceptible vibrations as a tactile feedback of current driving influences for a passenger of the motor vehicle correlating with the real current drive parameters of the motor vehicle,
wherein the tactile feedback correlates to different dynamic driving behavior of different vehicle drive trains, and at least by the different behavior during load changes of different drive motor types and/or by the different pitching behavior for different configurations of driven wheels of the motor vehicle.

15. A method of using at least one vibration unit of a vehicle system in a motor vehicle for re-production of vibrations, the method comprising:
generating, by the at least one vibration unit, perceptible vibrations as a tactile feedback of current driving influences for a passenger of a motor vehicle correlating with real drive parameters of the motor vehicle;
wherein the tactile feedback correlates to different dynamic driving behavior of different vehicle drive trains, and at least by the different behavior during load changes of different drive motor types and/or by the different pitching behavior for different configurations of driven wheels of the motor vehicle.

* * * * *